3,580,917
PROCESS FOR PRODUCING PYRIDINE BASES

Yoshiaki Numa and Akio Nakamachi, Saitama, and Yasukazu Murakami, Kawasaki-shi, Kanagawa, Japan, assignors to Daicel Ltd., Osaka, Japan
No Drawing. Filed June 13, 1968, Ser. No. 736,560
Claims priority, application Japan, June 14, 1967, 42/37,595
Int. Cl. C07d 31/02
U.S. Cl. 260—290                  6 Claims

ABSTRACT OF THE DISCLOSURE

A process for producing $\beta$-picoline and pyridine in which a gaseous mixture of acrolein and propylene oxide are reacted with ammonia in the gas phase at an elevated temperature in the presence of a solid acid catalyst so that $\beta$-picoline and pyridine are produced at a high yield and without producing $\gamma$-picoline.

BACKGROUND OF THE INVENTION

Field of the invention

This invention relates to a process for producing pyridine bases, and, more especially, relates to a process for producing $\beta$-picoline and pyridine by a gas phase catalytic reaction of acrolein and propylene oxide with ammonia.

Discussion of the prior art

Many attempts have been made to synthesize useful pyridine bases, which are now mainly obtained by the distillation of coal tar, using raw materials which can be produced in the petroleum chemical industry. Acrolein, which can be obtained by the oxidation of propylene, is one of such important raw materials. It is already known to synthesize $\beta$-picoline by a gas phase catalytic reaction of acrolein with ammonia. For example H. Wagner et al. reported in a paper [Angewandte Chemie, 62 112 (1950)] that $\beta$-picoline was produced by the reaction of acrolein with ammonia using aluminum phosphate at a catalyst.

Even though propylene oxide is one raw material which can be obtained economically in the petroleum chemical industry, it is of little importance to react propylene oxide with ammonia in the gas phase to obtain $\beta$-picoline and pyridine because of the low yield. For example, a gaseous mixture of ammonia and propylene oxide at a molar ratio of 1.5:1 was passed through a silica-alumina catalyst at 450° C. and only 11.1% of $\beta$-picoline, based on the propylene oxide fed in, was obtained. Other main products were 2,5-lutidine and 3,5-lutidine and only a slight amount of pyridine was obtained.

SUMMARY OF THE INVENTION

It has now been found that, if a mixture of acrolein and propylene oxide is used as a reactant, the propylene oxide is converted more effectively to $\beta$-picoline and pyridine by a reaction with ammonia.

For example, the following table shows the results of experiments in which one part of mixtures of propylene oxide and acrolein, of various molar ratios, is reacted with 1.5 parts of ammonia in the gas phase using silica- alumina as a catalyst at 450° C.

| Mixing ratio, mole of acrolein: propylene oxide | Yield in percent of $\beta$-picoline | Yield in percent of pyridine | Production ratio by weight of $\beta$-picoline to pyridine |
|---|---|---|---|
| 1:0.25 | 46.8 | 11.1 | 4.9 |
| 1:0.5 | 42.9 | 6.6 | 7.6 |
| 1:0.75 | 40.7 | 4.7 | 10.2 |
| 1:1 | 38.7 | 4.3 | 10.6 |
| 1:2 | 30.2 | 1.8 | 20.1 |

As shown in the table, the yields of $\beta$-picoline and pyridine are higher in the case of the reaction of acrolein, propylene oxide and ammonia than in the case of the reaction of propylene oxide and ammonia. Thus it is apparent that the addition of acrolein is effective to increase the amounts of $\beta$-picoline and pyridine. Furthermore, the ratio of $\beta$-picoline to pyridine varies greatly with changes is the ratio of acrolein to propylene oxide fed into the system, so that it is possible to control the ratio of $\beta$-picoline to pyridine by varying the ratio of acrolein to propylene oxide. Such a control is very important and advantageous in industry.

Another advantage to the use of a mixture of acrolein and propylene oxide is that there is no $\gamma$-picoline in the reaction products. The boiling point of $\gamma$-picoline is too to close to that of $\beta$-picoline to separate it from $\beta$-picoline by distillation. Therefore, the process of the invention makes it easy to purify $\beta$-picoline. On the contrary, when only acrolein is used, a considerable amount of $\gamma$-picoline will be contained in the products.

The catalyst and the reaction conditions used in the present invention may be the same as those for the production of $\beta$-picoline from acrolein and ammonia. That is to say, any kind of acidic solid such as silica-alumina, silica-magnesia and $\gamma$-alumina, can be used as a catalyst. Silica-alumina or silica-magnesia catalysts containing alumina or magnesia in amounts of 5–50% by weight, preferably in 10–30% by weight, are suitably used. Many kinds of metallic oxides can be used as promoters. Such promoters include, for example, oxides of tungsten, chromium, manganese, cobalt, zirconium, lead, cadmium and copper.

Though the reaction temperature may be varied within a wide range, it is generally preferable to employ reaction temperatures in the range from 350 to 550° C. If the reaction temperature is higher than 550° C., the catalytic activity will decrease quickly and the yield will decrease because of the decomposition of the products. On the other hand, if the reaction temperature is lower than 350° C., the catalytic activity will decrease due to the adsorption of a high boiling point substance on the catalyst surface. The optimum temperature range is 400 to 500° C.

Acrolein and propylene oxide may be premixed in a liquid state and charged into an evaporator or they may be separately fed into an evaporator and mixed in the gaseous state. The gaseous mixture of acrolein and propylene oxide is then mixed with ammonia, preheated if required, and passed through a catalyst bed kept at the reaction temperature. Either a fixed bed type or a fluidized bed type can be used as a reactor. The contact time is preferably selected to be in the range of from 1 to 20 seconds.

The molar ratio of propylene oxide to acrolein in the process of the present invention may suitably be less than 3, preferably less than 2. If the amount of propylene oxide added is too much, the yields of pyridine and $\beta$-picoline will become low. On the other hand, at least 0.01 mole, preferably more than 0.03 mole, of propylene oxide should be added per each 1 mole of acrolein. By selecting a suitable ratio within the above-mentioned range, $\beta$-picoline and pyyridine can be obtained at high yields with a proper ratio of the products, without producing any $\gamma$-picoline. Further, a ratio of 0.5 to 2 moles of ammonia to 1 mole of the sum of acrolein and propylene oxide is preferably used.

DESCRIPTION OF THE PREFERRED EMBODIMENTS

The present invention shall be concretely explained in the following examples in which the yield is calculated by assuming that 1 mole of the products is obtained from 2 moles of the mixture of acrolein and propylene oxide.

Example 1

A gaseous mixture of 1 mole of acrolein and 1 mole of propylene oxide was mixed with 3 moles of preheated ammonia. This mixture was passed through a reactor charged with a silica-alumina catalyst containing 80% $SiO_2$ and 20% $Al_2O_3$. The reactor was kept between 400 and 450° C. The contact time was 3 seconds. The reaction products were cooled down and collected and were then analyzed by gas chromatography. The yield of $\beta$-picoline was 39.0% and that of pyridine was 3.9%. No $\gamma$-picoline was found. The weight ratio of $\beta$-picoline to pyridine was 11.9.

Example 2

A gaseous mixture of 1 mole of acrolein and 1.5 moles of propylene oxide was mixed with 3.8 moles of preheated ammonia and was passed through a reaction tube. The reaction conditions were the same as in Example 1. The yield of $\beta$-picoline was 34.6% and that of pyridine was 2.7%. No $\gamma$-picoline was found. The weight ratio of $\beta$-picoline to pyridine was 15.1.

Example 3

A gaseous mixture of 3 moles of acrolein and 2 moles of propylene oxide was mixed with 7.5 moles of preheated ammonia and was passed through a reaction tube. The reaction conditions were the same as in Example 1. The yield of $\beta$-picolnie was 41.3% and that of pyridine was 5.1%. No $\gamma$-picoline was found. The weight ratio of $\beta$-picoline to pyridine was 9.6.

Example 4

A gaseous mixture of 3 moles of acrolein and 1 mole propylene oxide was mixed with 6 moles of preheated ammonia and was passed through a reaction tube. The reaction conditions were the same as in Example 1. The yield of $\beta$-picoline was 45.4% and that of pyridine was 9.3%. No $\gamma$-picoline was found. The weight ratio of $\beta$-picoline to pyridine was 5.7.

Example 5

A gaseous mixture of 5 moles of acrolein and 1 mole of propylene oxide was mixed with 9 moles of preheated ammonia and was passed into reaction tube. The reaction conditions were the same as in Example 1. The yield of $\beta$-picoline was 48.6% and that of pyridine was 12.6%. No $\gamma$-picoline was found. The weight ratio of $\beta$-picoline to pyridine was 4.5.

The embodiments of the invention in which an exclusive property of privilege is claimed are defined as follows:

1. A process for producing $\beta$-picoline and pyridine which comprises reacting a gaseous mixture of acrolein and propylene oxide containing at least 0.01 mole of propylene oxide per mole of acrolein, with ammonia in the gas phase at an elevated temperature in the presence of a solid acid catalyst selected from the group consisting of silica-alumina, silica-magnesia and, $\gamma$-alumina.

2. A process as claimed in claim 1, in which the gaseous mixture contains less than 3 moles of propylene oxide for each mole of acrolein, the reaction temperature being between 350 and 550° C.

3. A process as claimed in claim 2 wherein the molar ratio of ammonia to the sum of acrolein and propylene oxide is from 0.5-2:1.

4. A process as claimed in claim 2 wherein said solid acid catalyst is a silica-alumina catalyst containing from 5–50% by weight of alumina.

5. A process as claimed in claim 2, wherein said solid acid catalyst is a silica-magnesia catalyst containing from 5–50% by weight of magnesia.

6. A process as claimed in claim 2, in which the contact time of the reactants with the catalyst is in the range of 1–20 seconds.

References Cited

UNITED STATES PATENTS 3,428,640  2/1969.  Mailey _____ 260—290

HENRY R. JILES, Primary Examiner

H. I. MONTZ, Assistant Examiner